(12) United States Patent
Wiedmann et al.

(10) Patent No.: US 7,784,361 B2
(45) Date of Patent: Aug. 31, 2010

(54) ELECTRONIC FLUID DISPENSING APPARATUS AND RELATED METHOD

(75) Inventors: Isaac M. Wiedmann, Middleton, WI (US); Troy A. Goldschmidt, Verona, WI (US)

(73) Assignee: Bong Tech, L.L.C., Middleton, WI (US)

( * ) Notice: Subject to any disclaimer, the term of this patent is extended or adjusted under 35 U.S.C. 154(b) by 175 days.

(21) Appl. No.: 12/117,881

(22) Filed: May 9, 2008

(65) Prior Publication Data
US 2008/0276722 A1    Nov. 13, 2008

Related U.S. Application Data

(60) Provisional application No. 60/917,177, filed on May 10, 2007.

(51) Int. Cl.
*G01F 1/37* (2006.01)
(52) U.S. Cl. .................................................. 73/861.52
(58) Field of Classification Search .............. 73/861.52, 73/207; 141/300; 131/173; 33/726; 128/760; 222/158
See application file for complete search history.

(56) References Cited

U.S. PATENT DOCUMENTS

| | | | |
|---|---|---|---|
| 4,006,634 A * | 2/1977 | Billette et al. ............. | 73/861.53 |
| 4,253,475 A * | 3/1981 | Schreiber et al. ............ | 131/173 |
| 4,335,730 A * | 6/1982 | Griffin ........................ | 600/573 |
| 5,176,148 A * | 1/1993 | Wiest et al. ................. | 600/573 |
| 5,241,753 A * | 9/1993 | Lalevee, Sr. ................. | 33/726 |
| 5,479,970 A * | 1/1996 | Trani ........................... | 141/297 |
| 5,511,595 A * | 4/1996 | Stidham ..................... | 141/300 |
| 5,964,382 A | 10/1999 | Randal | |
| 6,073,632 A * | 6/2000 | Tolja .......................... | 131/173 |
| 6,216,919 B1 * | 4/2001 | Ae' et al. .................... | 222/158 |
| 7,185,788 B2 | 3/2007 | Morris | |
| 2006/0086754 A1 | 4/2006 | Morris | |

FOREIGN PATENT DOCUMENTS

| | | | |
|---|---|---|---|
| DE | SU 1166749 A * | 7/1985 | |
| DE | 4120729 A1 * | 1/1993 | |
| EP | 1930141 A2 * | 6/2008 | |
| JP | 6241172 A | 8/1994 | |

(Continued)

OTHER PUBLICATIONS

PCT International Search Report for International Application No. PCT/US2008/063178 filed May 9, 2008.

(Continued)

*Primary Examiner*—Jewel Thompson
(74) *Attorney, Agent, or Firm*—Mark E. Scott; Conley Rose, P.C.

(57) ABSTRACT

An electronic fluid dispensing apparatus and related method. At least some of the illustrative embodiments are apparatuses comprising a funnel comprising a receiving mouth open to atmosphere, a sidewall that defines a frustum, and an apex that comprises an end portion (the frustum tapers from the receiving mouth towards the apex), a tube fluidly coupled to the end portion (the tube configured to receive a fluid from the funnel, the combined volume of the funnel and the tube being no greater than 64 fluid ounces), and a device coupled to the tube (the device configured to determine a parameter of a fluid that flows through the funnel and tube).

20 Claims, 4 Drawing Sheets

FOREIGN PATENT DOCUMENTS

| | | | |
|---|---|---|---|
| JP | DE 19613599 | * | 4/1996 |
| JP | 11079289 | | 3/1999 |
| JP | 2002225987 | | 8/2002 |

OTHER PUBLICATIONS

Author Unknown, "Home::Beer Bong Kits:: Six Shooter Beer Bong", available on the Internet at http://buypartygear.com/zencart/six-shooter-beer-bong-p-10.html at least as early as May 9, 2008.

Author Unknown, "Home::Beer Bong Kits:: Double Shot Beer Bong", available on the Internet at http://buypartygear.com/zencart/double-shot-beer-bong-p-4.html at least as early as May 9, 2008.

Author Unknown, "Home::Beer Bong Kits:: Beer Bong Solo W/ Valve", available on the Internet at http://buypartygear.com/zencart/beer-bong-solo-w-valve-p-3.html at least as early as May 9, 2005.

* cited by examiner

ELECTRONIC FLUID DISPENSING APPARATUS AND RELATED METHOD

CROSS-REFERENCE TO RELATED APPLICATION

This application claims the benefit of provisional application 60/917,177, filed May 10, 2007, titled "Electronic Fluid Dispensing Apparatus", and which application is incorporated by reference herein as if reproduced in full below.

BACKGROUND

A "bong" is a device comprising a funnel fluidly coupled to a tube that is used to enable the rapid flow of a beverage from the funnel, through the tube, and out of an end of the tube. A user places his/her mouth around the end of the tube and receives the fluid rapidly into his/her mouth for consumption. Beer is often the beverage consumed in this manner; thus, such a device is often referred to as a "beer bong". The act of consuming a beer by way of a beer bong may be referred to as "bonging", "performing a bong", or "doing a beer bong". The practice of consuming beverages, especially beer, rapidly by way of a bong is often done in competition among a group of individuals and is a practice that is common among college students, other young people, and other individuals looking for alternative methods of consuming their beverages.

Individuals engaged in consuming beer, or other beverages, by way of a bong would often like to know how much beer they consumed and how fast it was consumed. Such questions are often answered by visual inspection and a stopwatch. In addition, groups of individuals often compete with each other to see who could drink more or who could drink faster. Again however, there is not a reliable method of determining these facts other than visual inspection and a timekeeper. Attempts have been made to circumvent this problem, such as by way of a bong having a plurality of tubes fluidly coupled to a single funnel into which the beverage is poured and intended to accommodate a plurality of users at once. However, determining an exact volume consumed, consumption rate, or other information when using such devices is still a highly subjective task.

SUMMARY

The problems noted above are solved in large part by an electronic fluid dispensing apparatus and related method. At least some of the illustrative embodiments are apparatuses comprising a funnel comprising a receiving mouth open to atmosphere, a sidewall that defines a frustum, and an apex that comprises an end portion (the frustum tapers from the receiving mouth towards the apex), a tube fluidly coupled to the end portion (the tube configured to receive a fluid from the funnel, the combined volume of the funnel and the tube being no greater than 64 fluid ounces), and a device coupled to the tube (the device configured to determine a parameter of a fluid that flows through the funnel and tube).

Other illustrative embodiments are fluidic measurement devices comprising a microcontroller, and a device electrically coupled to the microcontroller and configured to be in operational relationship to a fluid. The fluidic measurement device configured to determine a parameter of a fluid that flows through a segment of a tube (an outside diameter of the segment of the tube being no greater than 1.5 inches). The segment of the tube configured to receive the fluid via a first end. The segment of the tube configured to discharge the fluid via a second end directly into a user's mouth (the second end held entirely inside the user's mouth).

Yet other illustrative embodiments are methods comprising detecting that a user starts to perform a bong by a first device coupled to a flow of a fluid, generating data related to the flow of the fluid, and detecting an end of the performed bong by the first device.

Still other illustrative embodiments are apparatuses comprising a funnel comprising a receiving mouth open to atmosphere, a sidewall that defines a frustum, and an apex that comprises an end portion (the frustum tapers from the receiving mouth towards the apex), a tube comprising a first end fluidly coupled to the end portion and a second end (an outside diameter of the tube being no greater than 1.5 inches, the tube configured to receive a fluid from the funnel by the first end and the tube configured to discharge the fluid by the second end directly into a user's mouth, the second end held entirely inside the user's mouth), and a device coupled to the tube, the device comprises a microcontroller, a display electrically coupled to the microcontroller, and a sensor electrically coupled to the microcontroller (the sensor configured to be in operational relationship to the fluid). The device configured to detect that the user starts to perform a bong by a flow of the fluid through the funnel and the tube. The device configured to generate data related to the flow of the fluid. The device configured to detect an end of the performed bong by the flow of the fluid through the funnel and the tube.

BRIEF DESCRIPTION OF THE DRAWINGS

For a detailed description of various embodiments, reference will now be made to the accompanying drawings in which.

NOTATION AND NOMENCLATURE

Certain terms are used throughout the following description and claims to refer to particular system components. This document does not intend to distinguish between components that differ in name but not function.

In the following discussion and in the claims, the term "comprises" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

For purposes of this disclosure and in the claims, the act of consuming a fluid (e.g., the contents of a bottle or a can) by way of a fluid dispensing apparatus 100, by way of an apparatus 300, by way of an apparatus 600, by way of an apparatus 602, or by way of an apparatus 604 may be referred to as "bonging", "performing a bong", or "doing a beer bong".

DETAILED DESCRIPTION

Embodiments of the disclosed systems and methods relate to a fluid dispensing apparatus comprising a device, which is configured to capture data related to a fluid. In particular, the fluid dispensing apparatus comprises a funnel fluidly coupled to a first end of a tube. The device is coupled to a second end of the tube. In some embodiments, the device comprises a differential pressure sensor having a first port and a second port, wherein the first port and the second port are fluidly coupled to the second end of the tube. In other embodiments, the device comprises a pressure sensor in fluid communication with the tube, such as an absolute pressure sensor, a gauge pressure sensor, or a sealed pressure sensor. In yet other embodiments, the device comprises capacitive, inductive, or resistive sensors or devices. In still other embodiments, the device comprises a sensor, detector, or electronic device that is configured to independently sense, detect, measure, and/or calculate one or more parameters related to the fluid, where the parameters related to the fluid may comprise a volume, a time that fluid flows, a temperature of the fluid, a flow rate, a velocity, a density, a viscosity, or a surface tension, among others. In some embodiments, the device is coupled to an outer surface of the tube. In other embodiments, the device is an integral component of the tube. In yet other embodiments, the device is coupled to an inner surface of the tube. In some exemplary embodiments, the device is disposed within a flow of the fluid. In some illustrative embodiments, the second end may further comprise a valve, which is used to control the flow of the fluid through the apparatus.

For purposes of this disclosure and in the claims, an outside diameter of the tube (as discussed with reference to FIG. 1 and FIG. 3 below) is no greater than 1.5 inches at the end configured to discharge into a user's mouth. As such, the tube can be held entirely inside a user's mouth. Thus, the tube is configured to receive a fluid by a first end of the tube, and the tube is configured to discharge the fluid by a second end of the tube directly into a user's mouth, wherein the second end of the tube is held entirely inside the user's mouth.

The fluid dispensing apparatus as herein described may be equivalently referred to as a "bong" or a "beer bong". While the fluid dispensing apparatus may often be used with beer, other alcoholic and non-alcoholic beverages may be used as well. However, use of the fluid dispensing apparatus is not recommended with any beverage containing greater than 6% alcohol content by volume or with any beverage containing greater than the allowed alcohol content as may be regulated by federal, state, or local government.

Figure 1:
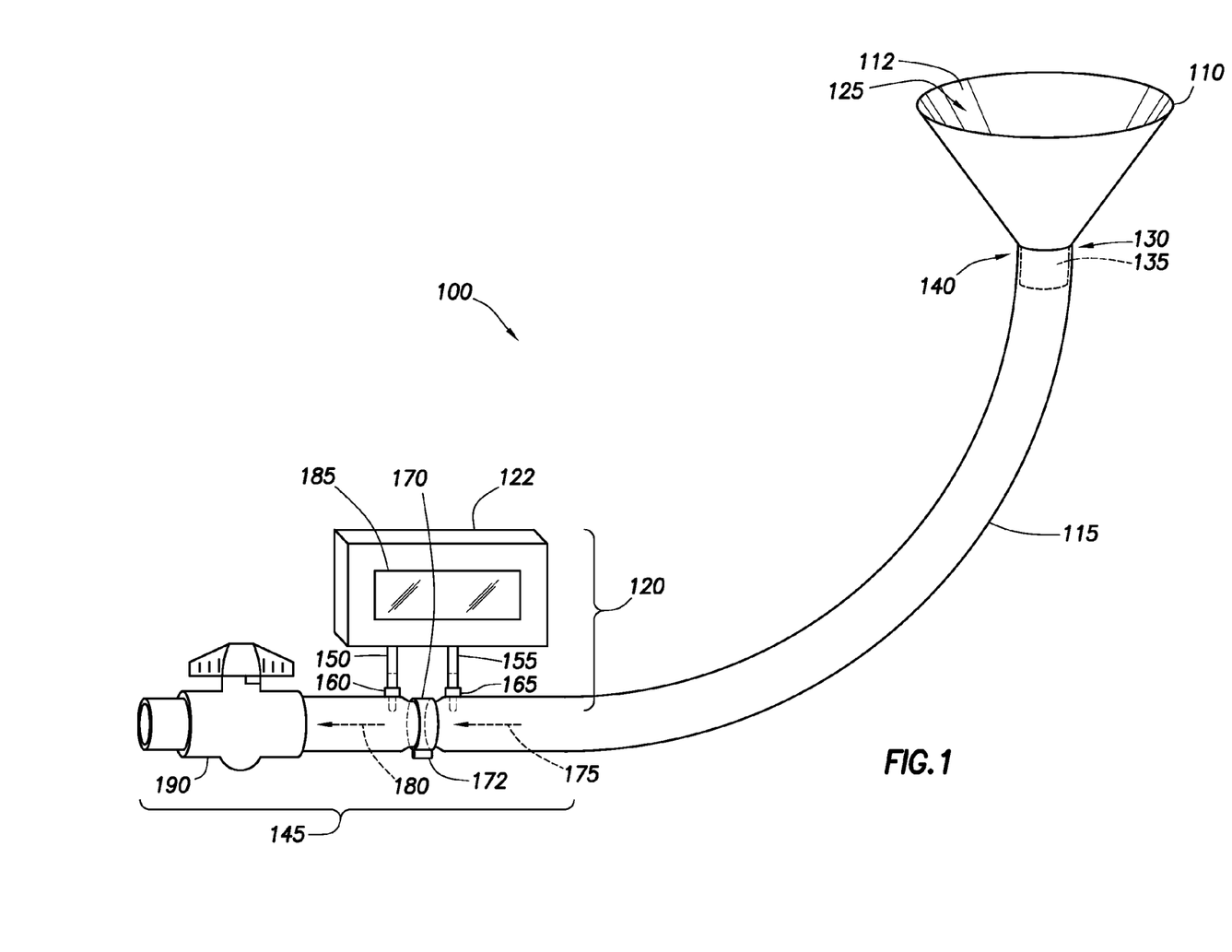
FIG. 1 illustrates an apparatus in accordance with various embodiments.

FIG. 1 illustrates a fluid dispensing apparatus 100 in accordance with some embodiments. The fluid dispensing apparatus 100 comprises a funnel 110, a tube 115, and a device 120. In some embodiments, the funnel 110 comprises a receiving mouth 125 and a sidewall 112 defining a conical frustum, which tapers from the receiving mouth 125 towards an apex 130. At the apex 130, the funnel 110 comprises a cylindrical end portion 135. Thus, the funnel 110 can be used to channel a fluid, which is poured into the receiving mouth 125, towards the apex 130 such that the fluid exits the cylindrical end portion 135. In alternative embodiments, the funnel 110 may comprise a sidewall 112, which defines one selected from the group consisting of: a pyramidal frustum; a cylinder; or a spherical segment. In addition, the funnel 110 may be fabricated from any of a variety of materials, such as polypropylene, glass, or stainless steel, among others.

As shown in FIG. 1, the tube 115 is fluidly coupled to the funnel 110. In particular, the cylindrical end portion 135 is fitted into a first end 140 of the tube 115 such that the funnel 110 is in fluid communication with the tube 115. Fluid poured into the receiving mouth 125 flows through the cylindrical end portion 135 and into the tube 115. For purposes of this disclosure, the tube 115 may be equivalently referred to as a pipe, a hose, or a conduit. The tube 115 may be fabricated from a variety of materials such as polyvinyl chloride (PVC), polyurethane, silicone, polypropylene, or nylon, among others. In some embodiments, the combined volume of the funnel 110 and the tube 115 is no greater than 64 ounces (i.e., two quarts). While the combined volume of the funnel 110 and the tube 115 can be up to 64 ounces, it is not intended or recommended that a single user consume the entire volume of fluid contained in the funnel 110 and/or the tube 115.

FIG. 1 further illustrates the device 120 coupled to a second end 145 of the tube 115. In particular, the device 120 comprises a differential pressure sensor having a first port and a second port. Each of the first port and the second port fluidly couple to one of a first tube 150 and a second tube 155. The first tube 150 and the second tube 155 fluidly couple to the tube 115 by way of a first connector 160 and a second connector 165. The first connector 160 and the second connector 165 can be inserted through openings punched into a side of the tube 115, wherein the openings are sized such that the first connector 160 and the second connector 165 couple to the tube 115 by way of a tight friction fit, which prevents unwanted fluid leakage. In addition, a tube constriction clamp 170 is coupled to an outer surface of the tube 115 such that a diameter (e.g., an inner diameter) of the tube 115 is smaller between the first tube 150 and the second tube 155 as compared to other portions of the tube 115, which have a larger (and about constant) diameter (e.g., the inner diameter). In some embodiments, the tube constriction clamp 170 further comprises an adjuster 172, which provides control over the amount of tube constriction. A fluid (represented by arrow 175 and arrow 180) flows through the constricted portion of the tube 115, and the fluid experiences an increase in velocity and a decrease in pressure. Such fluid behavior is an example of the Venturi Effect, and the pressure difference before and after the tube constriction clamp 170 (as measured by the differential pressure sensor) may be used in the calculation of data related to the flow of the fluid such as flow rate. In some embodiments, the device 120 further comprises a temperature sensor, which can be used to measure a temperature of the fluid. As illustrated in FIG. 1, the device 120 also comprises a housing 122 (e.g., a plastic case) and a display 185, which can be used, for example, to display any sensed, detected, measured, and/or calculated data related to the fluid or the flow of the fluid. In some embodiments, the display 185 comprises a liquid crystal display (LCD). In other embodiments, the display 185 comprises an alternative type of display. In some embodiments, a valve 190 is also coupled to the second end 145 of the tube 115 downstream from the device 120 in order to allow or restrict the flow of the fluid through the tube 115. In other embodiments, the valve 190 is coupled upstream from the device 120. In yet other embodiments, the device 120 and the valve 190 are one integral component.

While a differential pressure sensor and a tube constriction clamp 170 have been described as used to measure the flow of the fluid through the tube 115, other devices or methods may be equivalently used. For example, the differential pressure sensor can be paired with another type of tube constriction device such as an orifice plate disposed within the tube 115 and oriented substantially perpendicular to the stream of the flow of the fluid, a Venturi tube, a flow nozzle, a segmental wedge, or other tube construction, which causes a change in flow, pressure, and velocity. In some embodiments, the tube constriction device may comprise a short length of tube having an outside diameter smaller than an inside diameter of the tube 115 and configured such that the short length of tube telescopically couples within the tube 115 and is disposed at a position between the first tube 150 and the second tube 155 such that the effective inside diameter of the tube 115 is smaller between the first tube 150 and the second tube 155 as compared to other portions of the tube 115. In other embodiments, a sensor or flow meter other than a differential pressure sensor is used, such as an absolute pressure sensor, a gauge pressure sensor, a sealed pressure sensor, a sensor disposed within the flow of the fluid and configured to directly measure fluid properties, a calorimetric flow meter, or a turbine flow meter, among others. In yet other embodiments, the device 120 comprises, or is configured for use with, capacitive, inductive, or resistive sensors or devices (discussed below with reference to FIG. 6A-FIG. 6C). In still other embodiments, the device 120 comprises a sensor, detector, or electronic device that is configured to independently sense, detect, measure, and/or calculate one or more parameters related to the fluid. For example, in some embodiments, the device 120 is configured to independently (and in some embodiments automatically) sense, detect, measure, and/or calculate one or more of a volume, a time, a temperature, a flow rate, a velocity, a density, a viscosity, or a surface tension, among others.

Figure 2:
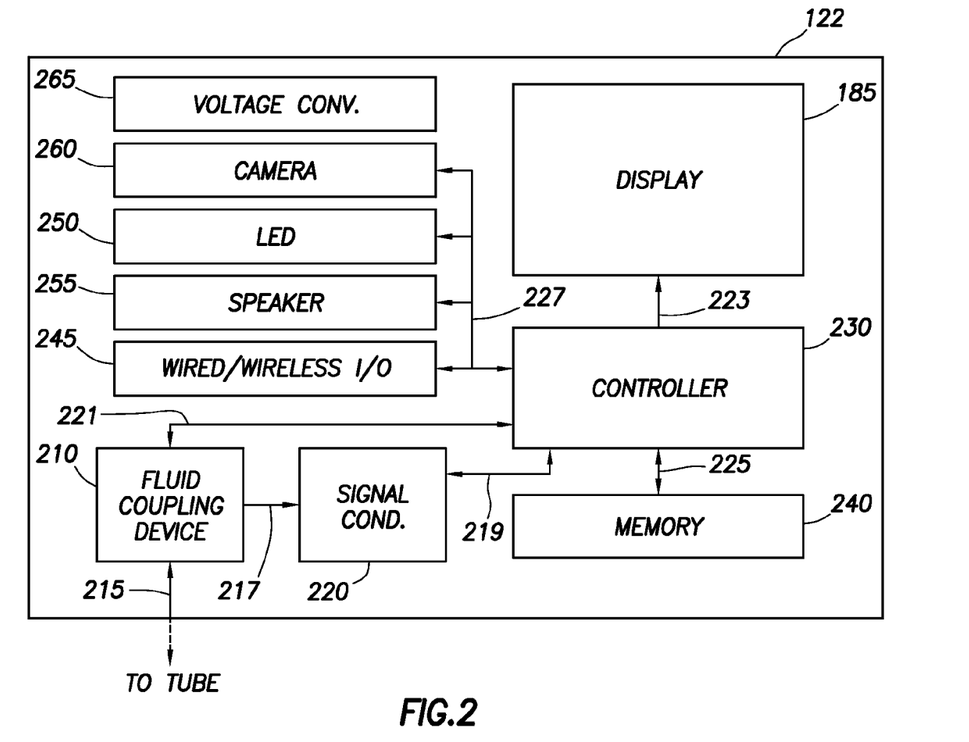
FIG. 2 illustrates a schematic of an apparatus in accordance with various embodiments.

FIG. 2 illustrates a schematic of components located within the housing 122 of the device 120 in accordance with some embodiments. For purposes of this disclosure, the phrase "the device comprises X" means that X can be located either within the housing as illustrated in FIG. 2, or can be located outside of the housing as illustrated in FIG. 1, FIG. 3, FIG. 6A, FIG. 6B, or FIG. 6C. Returning to FIG. 2, the device 120 comprises a display 185 (e.g., an LCD) and a fluid coupling device 210. In some embodiments, the fluid coupling device 210 comprises a differential pressure sensor. In other embodiments, the fluid coupling device 210 comprises, or is configured for use with, a temperature sensor, or other sensing, measuring, or detecting devices such as capacitive, inductive, or resistive sensors or devices (discussed below). The fluid coupling device 210 is in fluid communication with the tube 115 (as indicated by arrow 215). The fluid coupling device 210 senses a differential pressure of fluid flowing through the tube 115. Data collected by the fluid coupling device 210 is sent to an optional signal conditioner 220 for processing (as indicated by arrow 217). Alternatively, the fluid coupling device 210 sends the data directly to a microcontroller 230 (as indicated by arrow 221), and software within the microcontroller 230 may condition the data. For purposes of this disclosure, the microcontroller 230 may comprise any device that can read in data, perform operations on the data, and output and/or store results of the operations. The signal conditioner 220 is used to amplify an output of the fluid coupling device 210 and perform error compensation. Thereafter, data collected by the fluid coupling device 210 and processed by the signal conditioner 220 is sent to the microcontroller 230 (as indicated by arrow 219). In some embodiments, the microcontroller 230 is used to control the signal conditioner 220 (as indicated by arrow 219) or the fluid coupling device 210 (as indicated by arrow 221). The microcontroller 230 can also measure time by way of an internal clock and can be used to calculate, for example, a fluid flow rate. Since flow rate of a fluid is proportional to the square root of the differential pressure, the microcontroller 230 may calculate a variety of values such as average flow rate, maximum positive flow rate, or maximum negative flow rate (i.e., backwash). The microcontroller 230 can also calculate a total volume by integrating the flow rate over time. However, as discussed above, in some exemplary embodiments, the flow rate or volume, as well as a time, a temperature, a velocity, a density, a viscosity, or a surface tension can each be determined independently by way of a properly configured device 120. In embodiments wherein the device 120 also comprises a temperature sensor, the microcontroller 230 may interface with the temperature sensor and adjust calculations based on a temperature as measured by the temperature sensor.

Any of the sensed, detected, measured, and/or calculated data can be displayed via the display 185 (as indicated by arrow 223). In some embodiments, the display 185 displays the total time, average flow rate, maximum positive flow rate, maximum negative flow rate, total volume, or other sensed, detected, or calculated parameters in a scrolling fashion. In other embodiments, the display 185 can be used to display more complex data such as graphical data (e.g., flow rate versus time). While the microcontroller 230 comprises internal memory, the device 120 also comprises a memory 240, which interfaces with the microcontroller 230 (as indicated by arrow 225), wherein the memory 240 is used, for example, to store historical data of performed bongs or other non-numerical data such as a name of a user. In particular, a database may be implemented (e.g., within the memory 240) to store the historical data, image files captured by a camera 260 (discussed below), or other related data. In some embodiments, the historical data, the other non-numerical data, the image files, or the other related data may also be displayed via the display 185. In some embodiments, the sensed, detected, measured, and/or calculated data, including data or other files stored within the database, may be downloaded from or uploaded to a wired or wireless computer, another device 120, a mobile phone, a handheld device such as a PDA, or other wired or wireless electronic device by way of an input/output (I/O) device 245 (discussed below).

As illustrated in FIG. 2, the I/O device 245 communicates with the microcontroller 230 (as indicated by arrow 227). The I/O device 245 may comprise a wired interface such as a universal serial bus (USB) port, a wireless interface such as a BLUETOOTH® interface, an IEEE 802.11 compliant interface, a wireless interface such as a ZIGBEE® interface, or any other wired or wireless interface supporting any other wired or wireless protocol now known or later developed. The USB interface may enable the device 120 to function as a peripheral device to exchange information with a personal computer or other computer system. The BLUETOOTH® interface, the IEEE 802.11 compliant interface, the ZIGBEE® interface, or any other wireless interface supporting any other wireless protocol now known or later developed, enables the device 120 to communicate wirelessly with other nearby devices (e.g., during a competition wherein each of a plurality of users is performing a bong), wireless base stations, handheld mobile devices such as cellular phones or personal digital assistants, personal computers, or other wireless networks.

In some embodiments, the device 120 also comprises an LED 250 and a speaker 255. The LED 250 may be used to indicate, for example, who consumed the most beverage or who consumed the beverage the fastest (e.g., during a competition). The speaker 255 can be used, for example, to indicate when a user should begin or end performing his/her bong. In some embodiments, the speaker may also be used to announce data or other relevant information related to a user and the bong performed. In other embodiments, the device 120 also comprises a camera 260 (e.g., a charge coupled device (CCD) camera) used to capture action photographs of a user performing his/her bong. Each of the LED 250, the speaker 255, and the camera 260 may also communicate with the microcontroller 230 (as indicated by arrow 227).

In some embodiments, the device 120 comprises the housing 122. In particular, the housing 122 may be configured to hold at least two AAA batteries (e.g., two AAA alkaline batteries, which each output 1.5 volts). Two AAA alkaline batteries connected in series output 3 volts; however, in some embodiments, the display 185 (e.g. an LCD) operates on 5 volts. Thus, the device 120 may further comprise a DC-to-DC voltage converter 265, which is configured to raise the voltage of the two batteries in series such that the display 185 is adequately powered. For embodiments wherein the device 120 comprises the housing 122, openings can be cut out of the housing 122 in order to accommodate the display 185 as well as the first tube 150 and the second tube 155, which fluidly couple the fluid coupling device 210 to the tube 115.

In other embodiments, the device 120 does not comprise the housing 122. Instead, the device 120 may be coated with a lacquer, wherein the lacquer provides protection from moisture as well as some mechanical stability. In yet other embodiments, the device 120 may be encased in shrink wrap to provide protection from moisture. In embodiments wherein lacquer or shrink wrap is used, the number of batteries that may be used is not limited by the size of the housing 122; thus, more than two AAA batteries can be used, and the voltage converter 265 need not be used.

Figure 3:
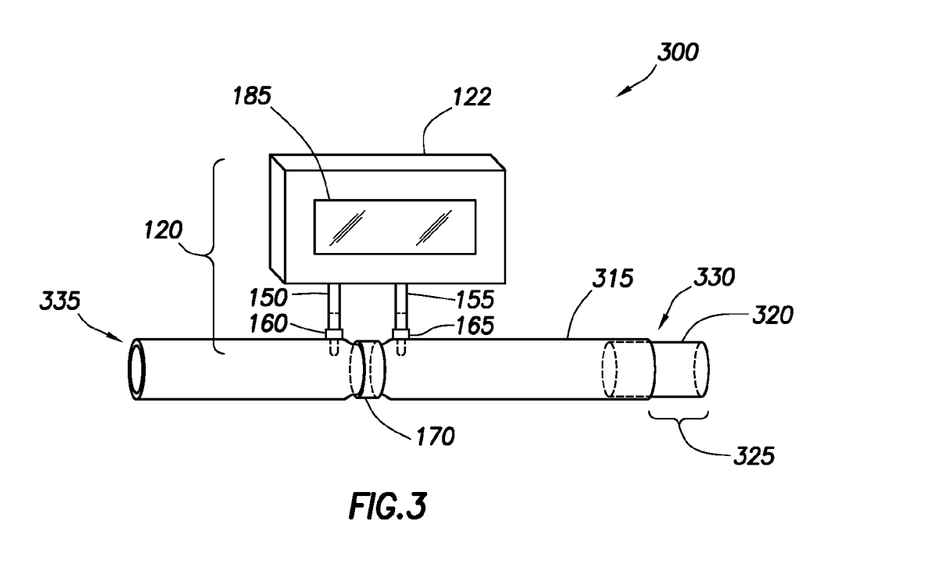
FIG. 3 illustrates an apparatus in accordance with alternative embodiments.

FIG. 3 illustrates alternative embodiments of an apparatus 300 wherein the device 120 is attached to a segment of tube 315. A tube adapter 320 telescopically couples within the segment of tube 315 while an end portion 325 of the segment of the tube adapter 320 remains outside of the segment of tube 315. Currently available bongs do not comprise a device 120 as illustrated in FIG. 1; however, the end portion 325 of the apparatus 300 can be fluidly and telescopically coupled to, for example, a drinking end of a tube of an existing bong. Thus, existing bongs can be modified by using the apparatus 300 to provide all the fluid measurement functionality as described with respect to the apparatus 100. In other exemplary embodiments, openings may be punched into a side of a tube of an existing bong, the first connector 160 and the second connector 165 can be inserted through the openings, and a tube constriction clamp 170 can be coupled to an outer surface of the tube 115, thereby coupling the device 120 to the existing bong and providing all the functionality as described with respect to the apparatus 100. In yet other embodiments, the apparatus 300 can be configured for use with a bottled or canned beverage. For example, a first end 330 of the apparatus 300 can be fluidly coupled to a bottle spout or can mouth (e.g., a can opening revealed by pulling a ring, which is operatively coupled to a tab) either with or without the tube adapter 320, and a user can consume the contents of the bottle (or can) by way of a second end 335 of the apparatus 300, wherein the contents of the bottle (or can) flow from the bottle (or can) into the first end 330, through the segment of tube 315, and are discharged via the second end 335 directly into a user's mouth. When configured for use with a bottled or canned beverage, the apparatus 300 may further comprise a venting tube fluidly coupled to a side of the segment of tube 315. The venting tube enhances the flow of the fluid from the bottle (or can) and through the apparatus 300. In still other embodiments, the apparatus 300 can be configured for use with a keg.

Figure 4:
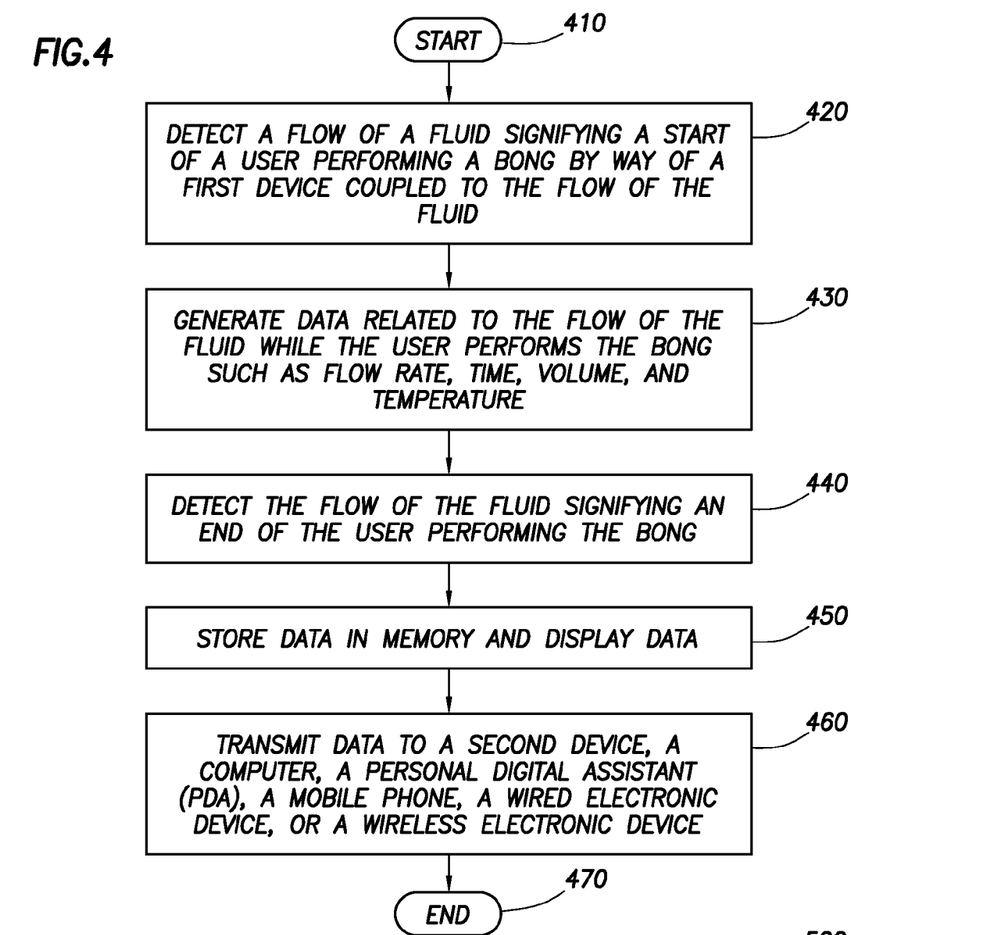
FIG. 4 illustrates a flow diagram in accordance with embodiments.

FIG. 4 illustrates a method (i.e., a software program) in accordance with some embodiments. The software program may be stored within the memory of the microcontroller 230 or within the memory 240, and the program may execute on the microcontroller 230. The method starts (block 410) and proceeds to detecting a flow of a fluid (e.g., by detecting a change in differential pressure of the flow of the fluid), which signifies a start of a user performing a bong (block 420). The flow of the fluid is detected by way of the device 120 coupled to the flow of the fluid. For example, when detecting the flow of the fluid by way of detecting a change in differential pressure, the differential pressure detected at the start of, and during, a user performing a bong is much larger than when no fluid is flowing through the tube 115. Data related to the flow of the fluid (e.g., the differential pressure data) is continually measured during the performance of the bong and calculations are performed by the microcontroller 230 (block 430). The microcontroller 230 may be used for the measurement or calculation of a plurality of parameters related to the fluid (e.g., flow rate, time, volume, and temperature). Each of the plurality of parameters, or a combination thereof, may be sensed, detected, measured, and/or calculated independently of the flow of the fluid, and each of the plurality of parameters may be measured before, during, or after the user performs the bong. For example, in some embodiments, the time, volume, or temperature may be measured independently of the flow of the fluid (e.g., using a stopwatch, using a known volume of fluid such as a 12 ounce beer can poured into the fluid dispensing apparatus 100, or using a thermometer to independently measure the temperature of the fluid), and the independently measured parameters may then be transferred to the microcontroller 230 (e.g., for use in subsequent calculations) by way of, for example, the I/O device 245. Moreover, in some other embodiments, the device 120 comprises capacitive, inductive, or resistive sensors or devices. In yet other embodiments, the device 120 comprises an alternative sensor, detector, or other alternative electronic device that is configured to independently sense, detect, measure, and/or calculate one or more parameters related to the fluid (e.g., without use of the microcontroller 230) such as a volume, a time, a temperature, a flow rate, a velocity, a density, a viscosity, or a surface tension, among others. A change in the flow of the fluid (e.g., a change in the differential pressure of the flow of the fluid) is then detected, which signifies an end of the user performing the bong (block 440). The sensed, detected, measured, and/or calculated data is then stored within the memory of the microcontroller 230 or within the memory 240, and the data is displayed by way of the display 185 (block 450). In some embodiments, the data is stored and displayed while the user performs the bong. In other embodiments, the data is stored and displayed after the user performs the bong. In yet other embodiments, the data is stored and displayed both while the user performs the bong and after the user performs the bong. The data may then be transmitted to another device 120, a computer, a PDA, a mobile phone, or other wired or wireless device by way of the I/O device 245 (block 460), and the method ends (block 470).

Figure 5:
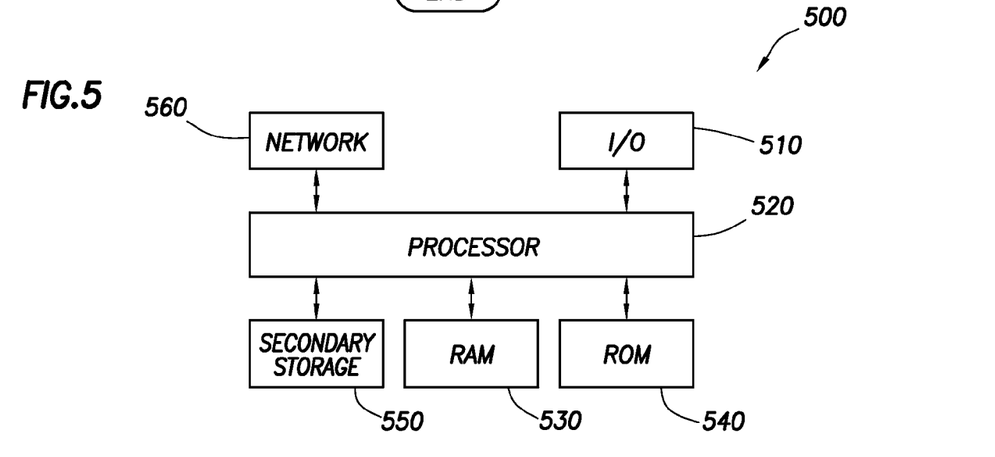
FIG. 5 illustrates a general purpose computer system suitable for implementing the several embodiments of the invention.

The device 120 functionality described above may be implemented, at least in part, on any general-purpose computer with sufficient processing power, memory resources, and network throughput capability to handle the necessary workload placed upon it. FIG. 5 illustrates a general-purpose computer system suitable for implementing one or more embodiments disclosed herein. The computer system 500 comprises a processor 520, which may be referred to as a central processor unit or CPU, that is in communication with memory devices including secondary storage 550, read only memory (ROM) 540, random access memory (RAM) 530, input/output (I/O) 510 devices, and network connectivity devices 560. The processor may be implemented as one or more CPU chips.

The secondary storage 550 comprises one or more disk drives or tape drives and is used for non-volatile storage of data and as an over-flow data storage device if RAM 530 is not large enough to hold all working data. Secondary storage 550 may be used to store programs, which are loaded into RAM 530 when such programs are selected for execution. The ROM 540 is used to store instructions and perhaps data, which are read during program execution. ROM 540 is a non-volatile memory device, which often has a small memory capacity relative to the larger memory capacity of secondary storage. The RAM 530 is used to store volatile data and perhaps to store instructions. Access to both ROM 540 and RAM 530 is often faster than to secondary storage 550.

I/O 510 devices may comprise printers, video monitors, liquid crystal displays (LCDs), touch screen displays, keyboards, keypads, switches, dials, mice, track balls, voice recognizers, card readers, paper tape readers, or other well-known input devices. The network connectivity devices 560 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 560 may enable the processor 520 to communicate with a global information system (e.g., the Internet) or one or more intranets. With such a network connection, it is contemplated that the processor 520 might receive information from the network, or might output information to the network in the course of performing the above-described method steps. Such information, which is often represented as a sequence of instructions to be executed using processor 520, may be received from and outputted to the network, for example, in the form of a computer data signal embodied in a carrier wave.

The information, which may comprise data or instructions to be executed using processor 520 for example, may be received from and outputted to the network, for example, in the form of a computer data baseband signal or signal embodied in a carrier wave. The baseband signal or signal embodied in the carrier wave generated by the network connectivity 560 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 520 executes instructions, codes, computer programs, scripts which it accesses from hard disk, floppy disk, optical disk (these various disk based systems may all be considered secondary storage 550), ROM 540, RAM 530, or the network connectivity devices 560.

The above discussion is meant to be illustrative of the principles and various embodiments of the present invention. Numerous variations and modifications will become apparent to those skilled in the art once the above disclosure is fully appreciated. For example, advanced software and/or firmware could allow for calculation and display of advanced statistics such as ranking of different parameters and overlaying graphs. Also, as shown in FIG. 6A-FIG. 6C, the fluid coupling device comprises, or is configured for use with, alternative sensing, measuring, or detecting devices such as capacitive, inductive, or resistive sensors or devices.

Figure 6A:
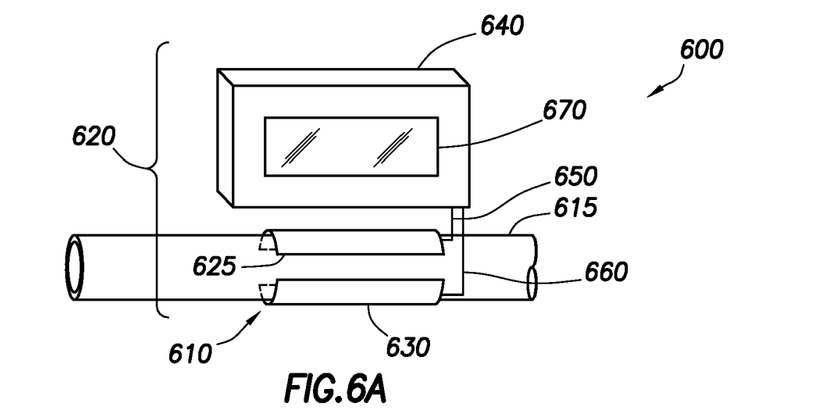
FIG. 6A illustrates an apparatus comprising a capacitor in accordance with various embodiments.

In particular, FIG. 6A illustrates alternative embodiments of an apparatus 600 comprising a device 620 and a capacitor 610. The capacitor 610 comprises a first conductive plate 625 and a second conductive plate 630 that can be positioned on an outer surface of a tube 615. The capacitor 610 measures a presence and/or flow of a fluid in the tube 615 by detecting changes in capacitance resulting from changes in a dielectric constant of material between the first and second conductive plates 625, 630, wherein the capacitance is directly proportional to the dielectric constant. In some embodiments, the material between the first and second conductive plates 625, 630 comprises the tube 615 and the fluid (when there is fluid in the tube 615) or air (when there is no fluid in the tube 615). Changes in an amount of fluid flowing through the tube 615 can also affect the dielectric constant of the material between the first and second conductive plates 625, 630, thus enabling detection of changes in capacitance and in the flow of the fluid. The capacitor 610 is coupled to one or more components within a housing 640 of the device 620 by way of a first conductor 650 and a second conductor 660. The change in capacitance due to the flow of the fluid and/or the presence of a fluid in the tube 615 is measured and stored within a memory of the device 620 and displayed on a display 670.

In some embodiments an insulating shield and/or a conductive shield is positioned around the first and second conductive plates 625, 630 to prevent electrical interference and/or electro-magnetic interference. In other embodiments, the capacitor 610 is disposed within a flow of a fluid in the tube 615, wherein the material between the first and second conductive plates 625, 630 does not comprise the tube 615. In some embodiments, the change in capacitance is measured by way of an oscillator, wherein an oscillator frequency depends on the measured capacitance. In other embodiments, other methods and/or devices for measuring and/or detecting capacitance are used such as various types of oscillators or a capacitance to digital converter (CDC).

Figure 6B:
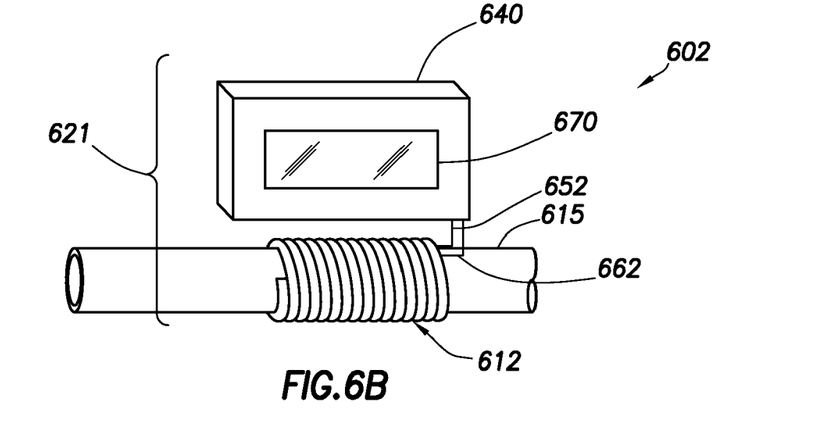
FIG. 6B illustrates an apparatus comprising an inductor in accordance with various embodiments.
Figure 6C:
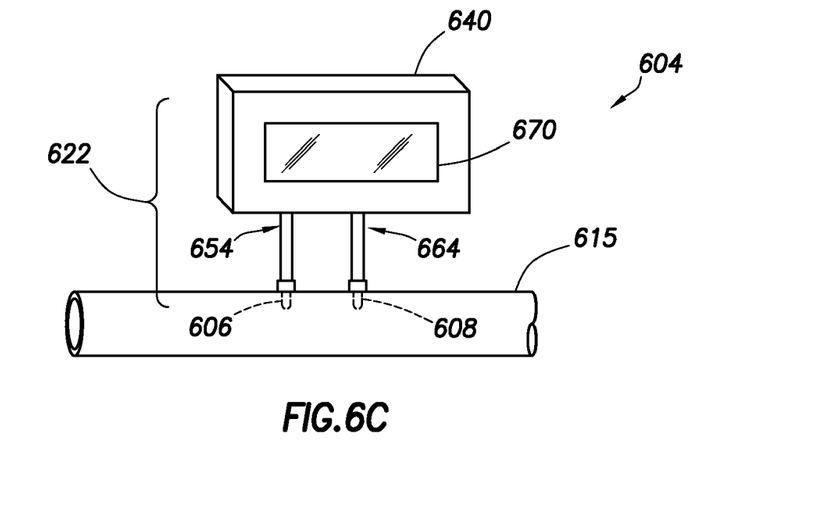
FIG. 6C illustrates an apparatus comprising a resistivity probe in accordance with various embodiments.

FIG. 6B illustrates alternative embodiments of an apparatus 602 comprising a device 621 and an inductor 612. The inductor 612 comprises inductive wire that is wrapped around an outer surface of the tube 615. A core of the inductor 612 consists of the tube 615 and the contents of the tube 615 (e.g., a fluid or air) within the portion of the tube 615 that is wrapped with the inductive wire. The inductor 612 measures a presence and/or flow of a fluid in the tube 615 by measuring an inductance, and if the contents of the tube 615 change or there is a flow of the fluid in the tube 615 then the measured inductance can change. The inductor 612 is coupled to one or more components within the housing 640 of the device 621 by way of a first conductor 652 and a second conductor 662. The change in inductance due to the flow of the fluid and/or the presence of a fluid in the tube 615 is measured and stored within the memory of the device 621 and displayed on the display 670.

In some embodiments an insulating shield and/or a conductive shield is positioned around the inductor 612 to prevent electrical interference and/or electro-magnetic interference. In other embodiments, the inductor 612 is disposed within the flow of the fluid in the tube 615, wherein the core of the inductor does not comprise the tube 615. In some embodiments, the change in inductance is measured by way of an oscillator, wherein an oscillator frequency depends on the measured inductance. In other embodiments, other methods and/or devices for measuring and/or detecting inductance are used such as various types of oscillators or an inductance to digital converter.

FIG. 6C illustrates alternative embodiments of an apparatus 604 comprising a device 622, a first resistivity probe 606, and a second resistivity probe 608. The first and second resistivity probes 608, 608 are placed within the flow of the fluid and the resistance between them is measured. The presence and/or flow of the fluid in the tube 615 is determined by measuring the resistance between the first and second resistivity probes 606, 608, and if the contents of the tube 615 (e.g., a fluid or air) change or there is a flow of the fluid in the tube 615 then the measured resistance can change.

The first and second resistivity probes 606, 608 are coupled to one or more components within the housing 640 of the device 622 by way of a first connector 654 and a second connector 664. In some embodiments, the first and second resistivity probes 606, 608 are integral to each of the first and second connectors 654, 664. In other embodiments, the first and second resistivity probes 606, 608 are passed through hollow shafts of each of the first and second connectors 654, 664. In yet other embodiments, the first and second connectors 654, 664 are insulating and/or conductive. The change in resistance due to the flow of the fluid and/or the presence of a fluid in the tube 615 is measured and stored within the memory of the device 622 and displayed on the display 670.

In some embodiments an insulating shield and/or a conductive shield is positioned around each of the first and second connectors 654, 664 to prevent electrical interference and/or electro-magnetic interference. In some embodiments, the change in resistance is directly measured by the first and second resistivity probes 606, 608, where measured resistance values are processed by a signal conditioner (which may comprise an analog-to-digital converter) and may then undergo further processing. In other embodiments, the change in resistance is measured by way of an oscillator, where an oscillator frequency depends on the measured resistance. In yet other embodiments, other methods and/or devices for measuring and/or detecting resistance are used.

It is intended that the following claims be interpreted to embrace all such variations and modifications.

What is claimed is:

1. An apparatus comprising:
   a funnel comprising a receiving mouth open to atmosphere, a sidewall that defines a frustum, and an apex that comprises an end portion, wherein the frustum tapers from the receiving mouth towards the apex;
   a tube with a first end and a second end, the first end of the tube fluidly coupled to the end portion, the tube configured to receive a fluid from the funnel, the combined volume of the funnel and the tube being no greater than 64 fluid ounces; and
   a device coupled to the tube, the device configured to determine a parameter of a fluid that flows through the funnel and the tube as the fluid discharges out the second end of the tube.

2. The apparatus according to claim 1 wherein the parameter comprises one or more selected from the group consisting of: a volume; a time that fluid flows; a temperature of the fluid; a flow rate; a velocity; a density; a viscosity; and a surface tension.

3. The apparatus according to claim 1 wherein the device further comprises a differential pressure sensor.

4. The apparatus according to claim 3 further comprising a device that constricts a portion of the tube, wherein a constricted tube diameter is less than an unconstricted tube diameter.

5. The apparatus according to claim 3 wherein the sensor further comprises a first port and a second port, the first port fluidly couples to the tube and the second port fluidly couples to the tube.

6. The apparatus according to claim 1 wherein the device further comprises one or more selected from the group consisting of: a capacitor configured to sense a capacitance of the fluid; an inductor configured to sense an inductance of the fluid; and a plurality of resistivity probes configured to measure a resistance of the fluid.

7. A fluidic measurement device comprising:
   a microcontroller; and
   a device electrically coupled to the microcontroller and configured to be in operational relationship to a fluid;
   the fluidic measurement device configured to determine a parameter of a fluid that flows through a segment of a tube, an outside diameter of the segment of the tube being no greater than 1.5 inches;
   the segment of the tube configured to receive the fluid via a first end; and
   the segment of the tube configured to discharge the fluid via a second end directly into a user's mouth, the second end held entirely inside the user's mouth.

8. The fluidic measurement device according to claim 7 wherein the fluidic measurement device is configured to perform one or more selected from the group consisting of: sense the parameter of the fluid; measure the parameter of the fluid; and calculate the parameter of the fluid.

9. The fluidic measurement device according to claim 7 further comprising one or more selected from the group consisting of: a wired input/output (I/O) device; and a wireless I/O device.

10. The fluidic measurement device according to claim 7 wherein the device electrically coupled to the microcontroller further comprises an electronic device configured to sense a differential pressure of the fluid by a differential pressure sensor coupled to the segment of the tube.

11. The fluidic measurement device according to claim 7 wherein the device electrically coupled to the microcontroller further comprises an electronic device configured to measure a capacitance of the fluid by a capacitor coupled to the segment of the tube.

12. The fluidic measurement device according to claim 7 wherein the device electrically coupled to the microcontroller further comprises an electronic device configured to measure an inductance of the fluid by an inductor coupled to the segment of the tube.

13. The fluidic measurement device according to claim 7 wherein the device electrically coupled to the microcontroller further comprises an electronic device configured to measure a resistance of the fluid by a plurality of resistivity probes coupled to the segment of the tube.

14. The fluidic measurement device according to claim 7 wherein the device electrically coupled to the microcontroller further comprises an electronic device configured to measure a temperature by a temperature sensor coupled to the segment of the tube.

15. A method comprising:
   detecting that a user starts to perform a bong by a first device coupled to a flow of a fluid;
   generating data related to the flow of the fluid; and
   detecting an end of the performed bong by the first device.

16. The method according to claim 15 wherein detecting that the user starts to perform the bong further comprises one or more selected from the group consisting of: sensing a pressure; sensing a differential pressure; measuring a capacitance; measuring an inductance; measuring a resistance; measuring a temperature; and directly measuring a flow rate.

17. The method according to claim 15 further comprising storing the data in a memory of the first device.

18. The method according to claim 15 further comprising displaying the data on a display of the first device.

19. The method according to claim 15 further comprising transmitting the data to one or more selected from the group consisting of: a second device; a computer; a personal digital assistant (PDA); a mobile phone; a wired electronic device; and a wireless electronic device.

20. An apparatus comprising:
- a funnel comprising a receiving mouth open to atmosphere, a sidewall that defines a frustum, and an apex that comprises an end portion, wherein the frustum tapers from the receiving mouth towards the apex;
- a tube comprising a first end fluidly coupled to the end portion and a second end, an outside diameter of the tube being no greater than 1.5 inches, the tube configured to receive a fluid from the funnel by the first end and the tube configured to discharge the fluid by the second end directly into a user's mouth, the second end held entirely inside the user's mouth; and
- a device coupled to the tube, the device comprises:
    - a microcontroller;
    - a display electrically coupled to the microcontroller; and
    - a sensor electrically coupled to the microcontroller, the sensor configured to be in operational relationship to the fluid;
- the device configured to detect that the user starts to perform a bong by a flow of the fluid through the funnel and the tube;
- the device configured to generate data related to the flow of the fluid; and
- the device configured to detect an end of the performed bong by the flow of the fluid through the funnel and the tube.

* * * * *